United States Patent
Zhang et al.

(10) Patent No.: US 11,489,471 B2
(45) Date of Patent: Nov. 1, 2022

(54) SYSTEMS AND METHODS FOR DETECTING STATOR WINDING FAULTS AND DEGRADATION

(71) Applicant: GM GLOBAL TECHNOLOGY OPERATIONS LLC, Detroit, MI (US)

(72) Inventors: Jiyu Zhang, Sterling Heights, MI (US); Siddharth Ballal, Fishers, IN (US); Lei Hao, Troy, MI (US); Wesley G. Zanardelli, Rochester, MI (US); Bojian Cao, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 133 days.

(21) Appl. No.: 16/715,102

(22) Filed: Dec. 16, 2019

(65) Prior Publication Data
US 2021/0184610 A1    Jun. 17, 2021

(51) Int. Cl.
| | |
|---|---|
| *H02P 9/10* | (2006.01) |
| *H02P 27/08* | (2006.01) |
| *H02P 21/22* | (2016.01) |
| *H02P 27/12* | (2006.01) |
| *H02P 21/20* | (2016.01) |
| *H02P 21/18* | (2016.01) |

(52) U.S. Cl.
CPC ............... *H02P 21/22* (2016.02); *H02P 21/18* (2016.02); *H02P 21/20* (2016.02); *H02P 27/12* (2013.01)

(58) Field of Classification Search
CPC ............ B60G 13/14; H02P 6/14; H02P 9/006
See application file for complete search history.

(56) References Cited

U.S. PATENT DOCUMENTS

| | | | |
|---|---|---|---|
| 6,236,227 B1 | 5/2001 | Kliman et al. | |
| 7,592,772 B2 | 9/2009 | Nandi et al. | |
| 8,362,732 B2 | 1/2013 | Anwar et al. | |
| 8,867,181 B2 * | 10/2014 | Hasan | H02P 29/032 |
| | | | 361/31 |
| 9,903,917 B2 * | 2/2018 | Kuruppu | H02P 29/0241 |
| 9,933,487 B2 | 4/2018 | Sharma et al. | |
| 10,026,241 B1 | 7/2018 | Sankavaram et al. | |

(Continued)

OTHER PUBLICATIONS

U.S. Appl. No. 15/978,720, filed May 14, 2018, Sarwar et al.
U.S. Appl. No. 15/986,282, filed May 22, 2018, Li et al.

*Primary Examiner* — Muhammad S Islam
*Assistant Examiner* — Charles S Laughlin (57) ABSTRACT

A diagnostic system includes: a current command module configured to, based on a motor torque request, a motor speed, a direct current (DC) bus voltage, generate a d-axis current command for an electric motor and a q-axis current command for the electric motor; a voltage command module configured to, based on the d-axis current command and the q-axis current command, generate a d-axis voltage command and a q-axis voltage command; a switching control module configured to control switching of an inverter module based on the d-axis voltage command and the q-axis voltage command, where the inverter module is configured to apply power to stator windings of the electric motor from the DC bus; and a fault module configured to selectively indicate that the stator windings of the electric motor are degraded when the d-axis voltage command is less than a predetermined nominal d-axis voltage of the electric motor.

20 Claims, 8 Drawing Sheets

(56) References Cited

U.S. PATENT DOCUMENTS

| | | |
|---|---|---|
| 10,054,030 B2 | 8/2018 | Duan et al. |
| 10,152,834 B1 | 12/2018 | Sankavaram et al. |
| 10,161,370 B2 | 12/2018 | Sarwar et al. |
| 10,167,803 B2 | 1/2019 | Sarwar et al. |
| 10,273,867 B2 | 4/2019 | Duan et al. |
| 10,355,634 B1 * | 7/2019 | Zhang ................. H02P 29/024 |
| 10,408,098 B2 | 9/2019 | Sarwar et al. |
| 2010/0295491 A1 * | 11/2010 | Schulz ................ G01R 31/346 |
| | | 318/490 |
| 2010/0320953 A1 * | 12/2010 | Yeh ........................ H02P 21/06 |
| | | 318/490 |
| 2011/0163709 A1 * | 7/2011 | Dai ........................ H02P 21/06 |
| | | 318/812 |
| 2011/0187304 A1 * | 8/2011 | Anwar ................ G01R 31/343 |
| | | 318/490 |
| 2019/0040812 A1 | 2/2019 | Sarwar et al. |
| 2019/0250205 A1 | 8/2019 | Sarwar et al. |

* cited by examiner

SYSTEMS AND METHODS FOR DETECTING STATOR WINDING FAULTS AND DEGRADATION

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicle propulsion systems and more particularly to systems and methods for controlling an electric motor of a vehicle.

Some types of vehicles include only an internal combustion engine that generates propulsion torque. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

In a feature, a diagnostic system of a vehicle includes: a current command module configured to, based on a motor torque request, a motor speed, a direct current (DC) bus voltage, generate a d-axis current command for an electric motor and a q-axis current command for the electric motor; a voltage command module configured to, based on the d-axis current command and the q-axis current command, generate a d-axis voltage command and a q-axis voltage command; a switching control module configured to control switching of an inverter module based on the d-axis voltage command and the q-axis voltage command, where the inverter module is configured to apply power to stator windings of the electric motor from the DC bus; and a fault module configured to selectively indicate that the stator windings of the electric motor are degraded when the d-axis voltage command is less than a predetermined nominal d-axis voltage of the electric motor.

In further features, the fault module is configured to indicate that the stator windings of the electric motor are degraded when the d-axis voltage command is both: less than the predetermined nominal d-axis voltage multiplied by a first predetermined scalar value; and greater than the predetermined nominal d-axis voltage multiplied by a second predetermined scalar value.

In further features, the second predetermined scalar value is less than the first predetermined scalar value.

In further features, the fault module is further configured to indicate that a fault is present in the stator windings of the electric motor when the d-axis voltage command is less than the predetermined nominal d-axis voltage multiplied by the second predetermined scalar value.

In further features, a limiting module is configured to limit the motor torque request to a predetermined maximum torque when the fault is present in the stator windings.

In further features, the motor torque request is not limited to the predetermined maximum torque when the fault is not present in the stator windings.

In further features, the fault module is further configured to indicate that the stator windings are not degraded and do not have a fault when the d-axis voltage command is greater than the predetermined nominal d-axis voltage multiplied by the first predetermined scalar value.

In further features, the fault module is configured to disable diagnosis of the stator windings of the electric motor when a fault has occurred in one of a speed sensor, a torque sensor, and a current sensor.

In further features, the fault module is configured to disable diagnosis of the stator windings of the electric motor when at least one of: a speed of the electric motor is outside of a predetermined speed range; and a torque of the electric motor is outside of a predetermined torque range.

In further features, the predetermined nominal d-axis voltage is set based on the predetermined speed range and the predetermined torque range.

In further features, the fault module is configured to disable diagnosis of the stator windings of the electric motor when the d-axis voltage command is not within a predetermined percentage of a d-axis voltage of the electric motor.

In a feature, a diagnostic system includes: a current command module configured to, based on a motor torque request, a motor speed, a direct current (DC) bus voltage, generate a d-axis current command for an electric motor and a q-axis current command for the electric motor; a voltage command module configured to, based on the d-axis current command and the q-axis current command, generate a d-axis voltage command and a q-axis voltage command; a switching control module configured to control switching of an inverter module based on the d-axis voltage command and the q-axis voltage command, where the inverter module is configured to apply power to stator windings of the electric motor from the DC bus; a state of health (SOH) module configured to, based on the d-axis voltage command, determine a SOH value corresponding to a SOH of the stator windings; and a fault module configured to selectively indicate that the stator windings of the electric motor are degraded based on the SOH value.

In further features, the fault module is configured to indicate that the stator windings are degraded when the SOH value is less than a first predetermined value and greater than a second predetermined value that is less than the first predetermined value.

In further features, the fault module is further configured to indicate that a fault is present in the stator windings when the SOH value is less than the second predetermined value.

In further features, a limiting module is configured to limit the motor torque request to a predetermined maximum torque when the fault is present in the stator windings.

In further features, the motor torque request is not limited to the predetermined maximum torque when the fault is not present in the stator windings.

In further features, the fault module is further configured to indicate that the stator windings are not degraded and do not have a fault when the SOH is greater than the first predetermined value.

In further features, the SOH module is configured to determine the SOH value further based on a predetermined nominal d-axis voltage of the electric motor.

In further features, the SOH module is configured to determine the SOH value based on (a) divided by (b), where (a) is an average of N of the d-axis voltage commands while a speed of the electric motor is within a predetermined speed range and a torque of the electric motor is within a predetermined torque range, where N is an integer greater than one; and (b) is the predetermined nominal d-axis voltage.

In further features, the predetermined nominal d-axis voltage is set based on the predetermined speed range and the predetermined torque range.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

An internal combustion engine of a vehicle combusts air and fuel within cylinders to generate propulsion torque. The engine outputs torque to wheels of the vehicle via a transmission. Some types of vehicles may not include an internal combustion engine or the internal combustion engine may not be mechanically coupled to a driveline of the vehicle.

An electric motor is mechanically coupled to a shaft of the transmission. Under some circumstances, a control module of the vehicle may apply power to the electric motor from a battery to cause the electric motor to output torque for vehicle propulsion. Under other circumstances, the control module may disable power flow to the electric motor and allow the transmission to drive rotation of the electric motor. The electric motor generates power when driven by the transmission. Power generated by the electric motor can be used to recharge the battery when a voltage generated via the electric motor is greater than a voltage of the battery.

The control module determines a d-axis (direct-axis) current command and a q-axis (quadrature-axis) current command for the electric motor based on a requested torque output of the electric motor. The control module determines d and q-axis voltage commands based on the d and q-axis current commands. The control module controls switching of an inverter based on the d and q-axis voltage commands.

Diagnostics of stator windings, however, may not be isolatable from diagnostics of associated sensors. Additionally, diagnostics of stator windings may be limited to diagnosing whether a fault is present in the stator windings or not. When a fault is diagnosed, torque output of the electric motor may be limited. Operability of a vehicle may therefore be limited when a fault is diagnosed.

The present application involves diagnosing degradation of stator windings of an electric motor prior to a fault occurring in the stator windings. This may allow a vehicle operator to operate the vehicle without limitation (or with minimal limitation) for a period (e.g., to seek vehicle service) before a fault occurs and operability of the vehicle is limited. The present application also isolates sensor faults from diagnostics regarding the stator windings.

Figure 1:
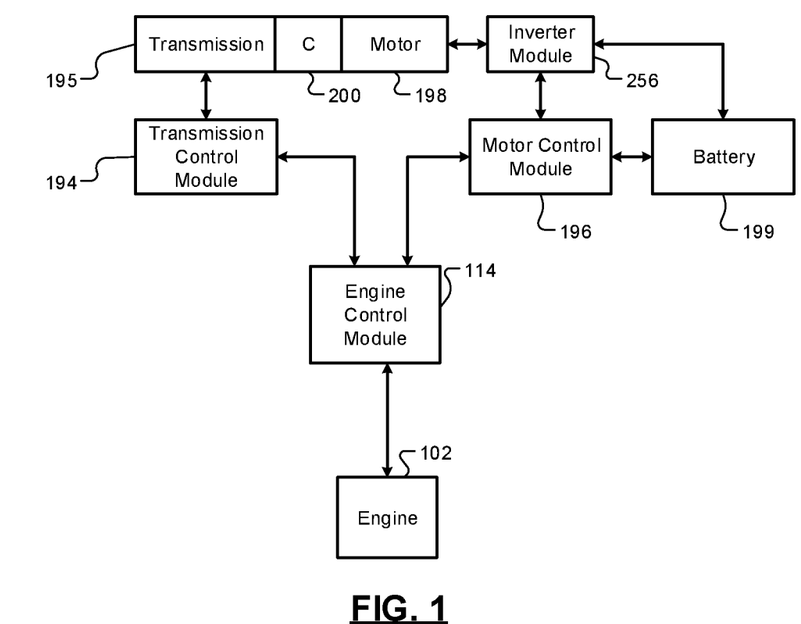
FIG. 1 is a functional block diagram of an example vehicle system.

Referring now to FIG. 1, a functional block diagram of an example vehicle system is presented. While a vehicle system for a hybrid vehicle is shown and will be described, the present disclosure is also applicable to electric vehicles that do not include an internal combustion engine, fuel cell vehicles, autonomous vehicles, and other types of vehicles. Also, while the example of a vehicle is provided, the present application is also applicable to non-vehicle implementations including an electric motor.

An engine 102 may combust an air/fuel mixture to generate drive torque. An engine control module (ECM) 114 controls the engine 102. For example, the ECM 114 may control actuation of engine actuators, such as a throttle valve, one or more spark plugs, one or more fuel injectors, valve actuators, camshaft phasers, an exhaust gas recirculation (EGR) valve, one or more boost devices, and other suitable engine actuators. In some types of vehicles (e.g., electric vehicles), the engine 102 may be omitted.

The engine 102 may output torque to a transmission 195. A transmission control module (TCM) 194 controls operation of the transmission 195. For example, the TCM 194 may control gear selection within the transmission 195 and one or more torque transfer devices (e.g., a torque converter, one or more clutches, etc.).

The vehicle system includes one or more electric motors, such as electric motor 198. An electric motor can act as either a generator or as a motor at a given time. When acting as a generator, an electric motor converts mechanical energy into electrical energy. The electrical energy can be, for example, used to charge a battery 199. When acting as a motor, an electric motor generates torque that may be used, for example, for vehicle propulsion. While the example of one electric motor is provided, the vehicle may include more than one electric motor.

A motor control module 196 controls power flow from the battery 199 to the electric motor 198 and from the electric motor 198 to the battery 199. The motor control module 196 applies electrical power from the battery 199 to the electric motor 198 to cause the electric motor 198 to output positive torque, such as for vehicle propulsion. The battery 199 may include, for example, one or more batteries and/or battery packs.

The electric motor 198 may output torque, for example, to an input shaft of the transmission 195 or to an output shaft of the transmission 195. A clutch 200 may be engaged to couple the electric motor 198 to the transmission 195 and disengaged to decouple the electric motor 198 from the transmission 195. One or more gearing devices may be implemented between an output of the clutch 200 and an input of the transmission 195 to provide a predetermined ratio between rotation of the electric motor 198 and rotation of the input of the transmission 195.

The motor control module 196 may also selectively convert mechanical energy of the vehicle into electrical energy. More specifically, the electric motor 198 generates and outputs power via back EMF when the electric motor 198 is being driven by the transmission 195 and the motor control module 196 is not applying power to the electric motor 198 from the battery 199. The motor control module 196 may charge the battery 199 via the power output by the electric motor 198. This may be referred to as regeneration.

Figure 2:
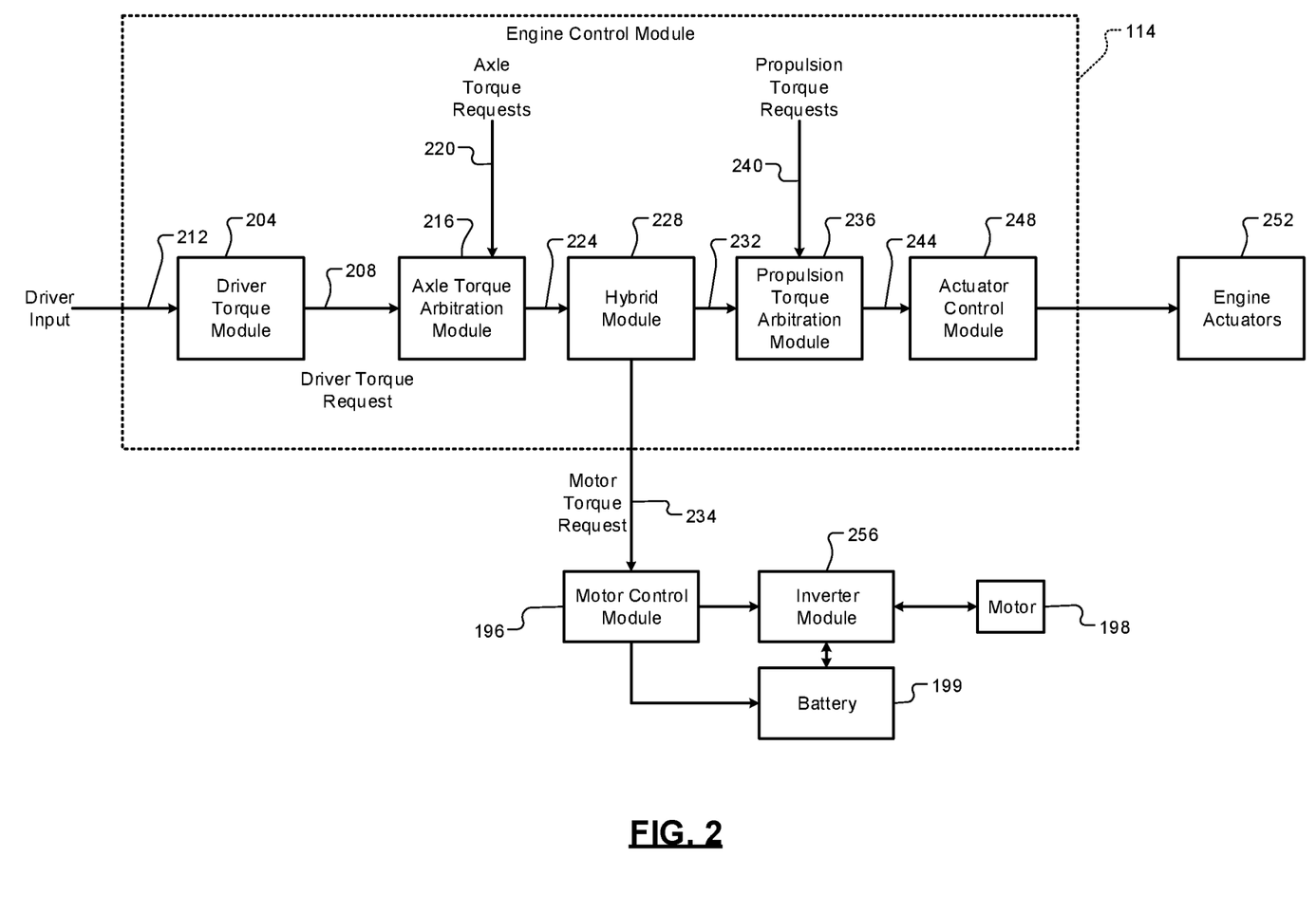
FIG. 2 is a functional block diagram of an example propulsion control system.

Referring now to FIG. 2, a functional block diagram of an example propulsion control system is presented. A driver torque module 204 determines a driver torque request 208 based on driver input 212. The driver input 212 may include, for example, an accelerator pedal position (APP), a brake pedal position (BPP), cruise control input, and/or an autonomous input. In various implementations, the cruise control input may be provided by an adaptive cruise control system that attempts to maintain at least a predetermined distance between the vehicle and objects in a path of the vehicle. The autonomous input may be provided by an autonomous driving system that controls movement of a vehicle from location to location while avoiding objects and other vehicles. The driver torque module 204 determines the driver torque request 208 based on one or more lookup tables that relate the driver inputs to driver torque requests. The APP and BPP may be measured using one or more APP sensors and BPP sensors, respectively.

The driver torque request 208 may be an axle torque request. Axle torques (including axle torque requests) refer to torque at the wheels. As discussed further below, propulsion torques (including propulsion torque requests) are different than axle torques in that propulsion torques may refer to torque at a transmission input shaft.

An axle torque arbitration module 216 arbitrates between the driver torque request 208 and other axle torque requests 220. Axle torque (torque at the wheels) may be produced by various sources including the engine 102 and/or one or more electric motors, such as the electric motor 198. Examples of the other axle torque requests 220 include, but are not limited to, a torque reduction requested by a traction control system when positive wheel slip is detected, a torque increase request to counteract negative wheel slip, brake management requests to reduce axle torque to ensure that the axle torque does not exceed the ability of the brakes to hold the vehicle when the vehicle is stopped, and vehicle overspeed torque requests to reduce the axle torque to prevent the vehicle from exceeding a predetermined speed. The axle torque arbitration module 216 outputs one or more axle torque requests 224 based on the results of arbitrating between the received axle torque requests 208 and 220.

In hybrid vehicles, a hybrid module 228 may determine how much of the one or more axle torque requests 224 should be produced by the engine 102 and how much of the one or more axle torque requests 224 should be produced by the electric motor 198. The example of the electric motor 198 will be continued for simplicity, but multiple electric motors may be used. The hybrid module 228 outputs one or more engine torque requests 232 to a propulsion torque arbitration module 236. The engine torque requests 232 indicate a requested torque output of the engine 102.

The hybrid module 228 also outputs a motor torque request 234 to the motor control module 196. The motor torque request 234 indicates a requested torque output (positive or negative) of the electric motor 198. In vehicles where the engine 102 is omitted (e.g., electric vehicles) or is not connected to output propulsion torque for the vehicle, the axle torque arbitration module 216 may output one axle torque request and the motor torque request 234 may be equal to that axle torque request. In the example of an electric vehicle, the ECM 114 may be omitted, and the driver torque module 204 and the axle torque arbitration module 216 may be implemented within the motor control module 196.

The propulsion torque arbitration module 236 converts the engine torque requests 232 from an axle torque domain (torque at the wheels) into a propulsion torque domain (e.g., torque at an input shaft of the transmission). The propulsion torque arbitration module 236 arbitrates the converted torque requests with other propulsion torque requests 240. Examples of the other propulsion torque requests 240 include, but are not limited to, torque reductions requested for engine over-speed protection and torque increases requested for stall prevention. The propulsion torque arbitration module 236 may output one or more propulsion torque requests 244 as a result of the arbitration.

An actuator control module 248 controls actuators 252 of the engine 102 based on the propulsion torque requests 244. For example, based on the propulsion torque requests 244, the actuator control module 248 may control opening of a throttle valve, timing of spark provided by spark plugs, timing and amount of fuel injected by fuel injectors, cylinder actuation/deactivation, intake and exhaust valve phasing, output of one or more boost devices (e.g., turbochargers, superchargers, etc.), opening of an EGR valve, and/or one or more other engine actuators. In various implementations, the propulsion torque requests 244 may be adjusted or modified before use by the actuator control module 248, such as to create a torque reserve.

The motor control module 196 controls switching of an inverter module 256 based on the motor torque request 234. Switching of the inverter module 256 controls power flow from the battery 199 to the electric motor 198. As such, switching of the inverter module 256 controls torque of the electric motor 198. The inverter module 256 also converts power generated by the electric motor 198 and outputs power to the battery 199, for example, to charge the battery 199.

The inverter module 256 includes a plurality of switches. The motor control module 196 switches the switches to convert DC power from the battery 199 into alternating current (AC) power and to apply the AC power to the electric motor 198 to drive the electric motor 198. For example, the inverter module 256 may convert the DC power from the battery 199 into n-phase AC power and apply the n-phase AC power to (e.g., a, b, and c, or u, v, and w) n stator windings of the electric motor 198. In various implementations, n is equal to 3. Magnetic flux produced via current flow through the stator windings drives a rotor of the electric motor 198. The rotor is connected to and drives rotation of an output shaft of the electric motor 198.

In various implementations, one or more filters may be electrically connected between the inverter module 256 and the battery 199. The one or more filters may be implemented, for example, to filter power flow to and from the battery 199. As an example, a filter including one or more capacitors and resistors may be electrically connected in parallel with the inverter module 256 and the battery 199.

Figure 3:
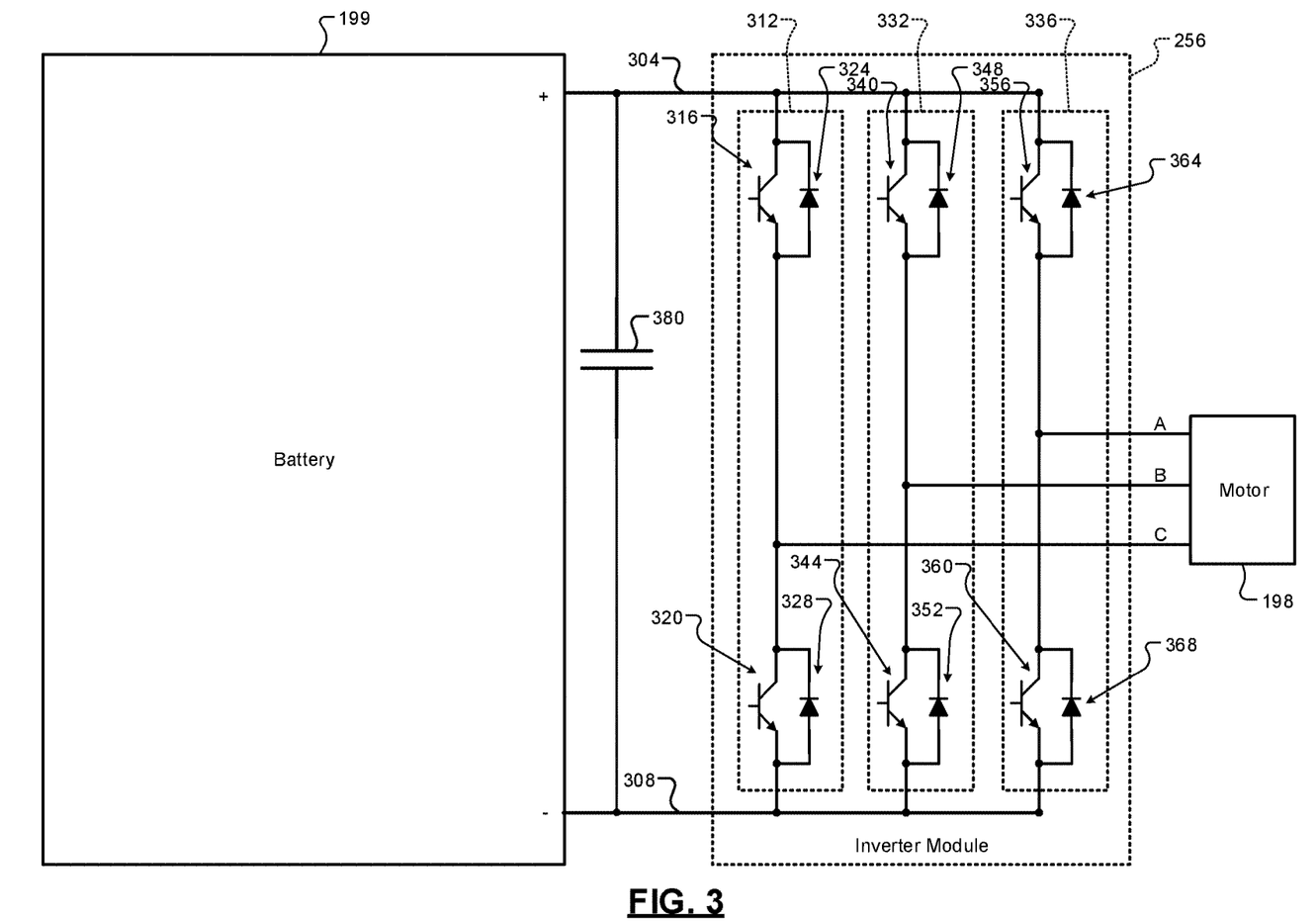
FIG. 3 is a schematic including an example implementation of an inverter module and a battery.

FIG. 3 includes a schematic including an example implementation of the inverter module 256 and the battery 199. High (positive) and low (negative) sides 304 and 308 are connected to positive and negative terminals, respectively, of the battery 199. The inverter module 256 is also connected between the high and low sides 304 and 308.

The inverter module 256 includes three legs, one leg connected to each phase of the electric motor 198. A first leg 312 includes first and second switches 316 and 320. The switches 316 and 320 each include a first terminal, a second terminal, and a control terminal. Each of the switches 316 and 320 may be an insulated gate bipolar transistor (IGBT), a field effect transistor (FET), such as a metal oxide semiconductor FET (MOSFET), or another suitable type of switch. In the example of IGBTs and FETs, the control terminal is referred to as a gate.

The first terminal of the first switch 316 is connected to the high side 304. The second terminal of the first switch 316 is connected to the first terminal of the second switch 320. The second terminal of the second switch 320 may be connected to the low side 308. A node connected to the second terminal of the first switch 316 and the first terminal of the second switch 320 is connected to a first phase (e.g., a) of the electric motor 198.

The first leg 312 also includes first and second diodes 324 and 328 connected anti-parallel to the switches 316 and 320, respectively. In other words, an anode of the first diode 324 is connected to the second terminal of the first switch 316, and a cathode of the first diode 324 is connected to the first terminal of the first switch 316. An anode of the second diode 328 is connected to the second terminal of the second switch 320, and a cathode of the second diode 328 is connected to the first terminal of the second switch 320. When the switches 316 and 320 are off (and open), power generated by the electric motor 198 is transferred through the diodes 324 and 328 when the output voltage of the electric motor 198 is greater than the voltage of the battery 199. This charges the battery 199. The diodes 324 and 328 form one phase of a three-phase rectifier.

The inverter module 256 also includes second and third legs 332 and 336. The second and third legs 332 and 336 may be (circuitry wise) similar or identical to the first leg 312. In other words, the second and third legs 332 and 336 may each include respective switches and diodes like the switches 316 and 320 and the diodes 324 and 328, connected in the same manner as the first leg 312. For example, the second leg 332 includes switches 340 and 344 and anti-parallel diodes 348 and 352. A node connected to the second terminal of the switch 340 and the first terminal of the switch 344 is connected to a second stator winding (e.g., b) of the electric motor 198. The third leg 336 includes switches 356 and 360 and anti-parallel diodes 364 and 368. A node connected to the second terminal of the switch 356 and the first terminal of the switch 360 is connected to a third stator winding (e.g., c) of the electric motor 198.

Figure 4:
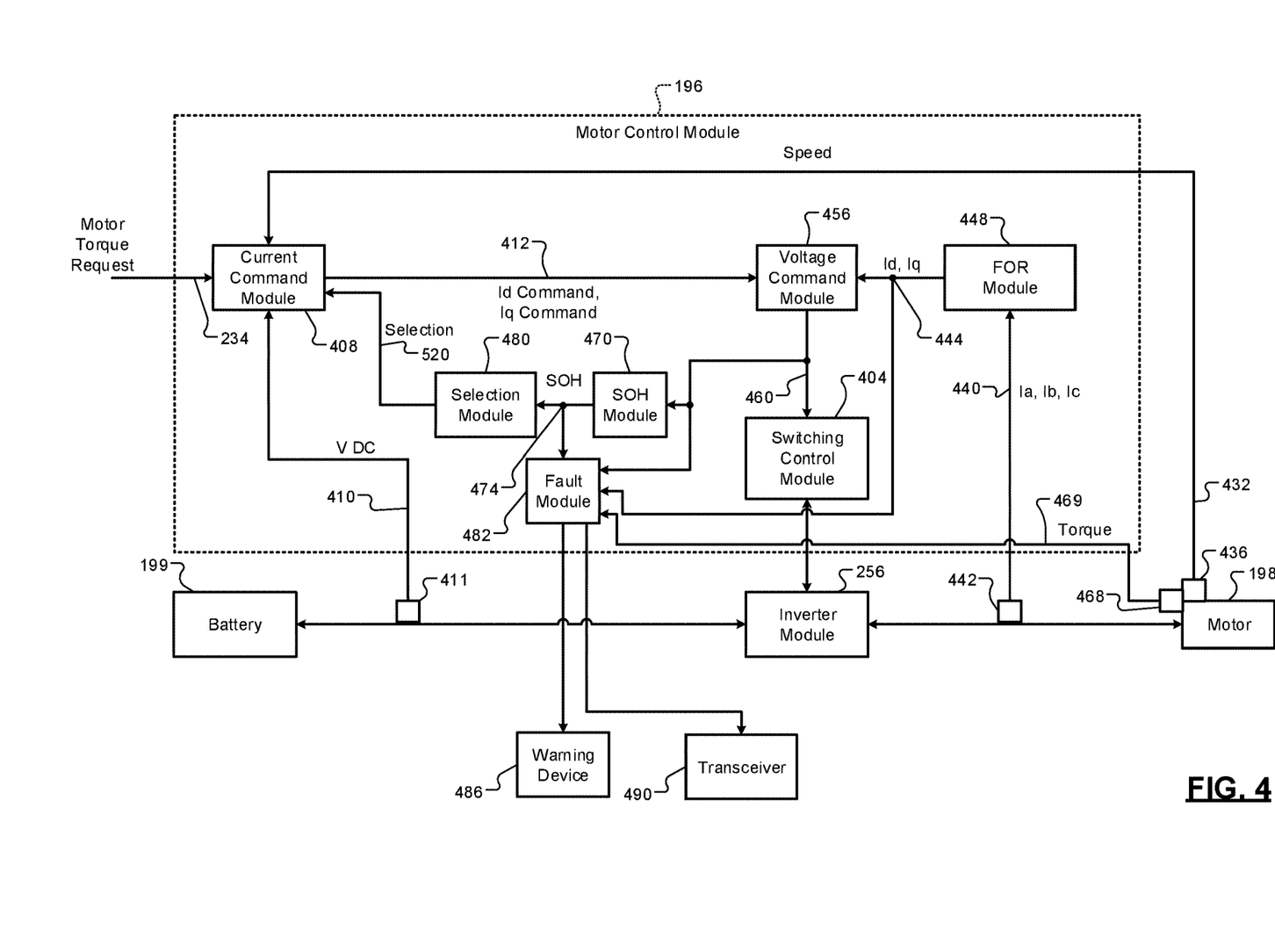
FIG. 4 is a functional block diagram including an example implementation of a motor control module.

FIG. 4 is a functional block diagram including an example implementation of the motor control module 196. A switching control module 404 controls switching of the switches 316 and 320 using pulse width modulation (PWM) signals. For example, the switching control module 404 may apply PWM signals to the control terminals of the switches 316, 320, 340, 344, 356, and 360. When on, power flows from the battery 199 to the electric motor 198 to drive the electric motor 198.

For example, the switching control module 404 may apply generally complementary PWM signals to the control terminals of the switches 316 and 320 when applying power from the battery 199 to the electric motor 198. In other words, the PWM signal applied to the control terminal of the first switch 316 is opposite in polarity to the PWM signal applied to the control terminal of the second switch 320. Short circuit current may flow, however, when the turning on of one of the switches 316 and 320 overlaps with the turning off of the other of the switches 316 and 320. As such, the switching control module 404 may generate the PWM signals to turn both of the switches 316 and 320 off during a deadtime period (T dead) before turning either one of the switches 316 and 320 on. With this in mind, generally complementary may mean that two signals have opposite polarities for a majority of their periods when power is being output to the electric motor 198. Around transitions, however, both PWM signals may have the same polarity (off) for some overlap deadtime period.

The PWM signals provided to the switches of the second and third legs 332 and 336 may also be generally complementary per leg. The PWM signals provided to the second and third legs 332 and 336 may be phase shifted from each other and from the PWM signals provided to the switches 316 and 320 of the first leg 312. For example, the PWM signals for each leg may be phase shifted from each other leg by 120° (360°/3 legs=120° shift per leg). In this way, the currents through the stator windings (phases) of the electric motor 198 are phase shifted by 120° from each other.

A current command module 408 determines a d-axis current command (Id Command) and a q-axis current command (Iq Command) for the electric motor 198 based on the motor torque request 234, a (mechanical) rotor speed 432 of the electric motor 198, and a DC bus voltage 410. The d-axis current command and the q-axis current command are collectively illustrated by 412 in FIG. 4. A voltage sensor 411 measures the DC bus voltage 410 between the battery 199 and the inverter module 256 (e.g., between the high and low sides 304 and 308), such as a voltage across a DC bus capacitor 380. The axis of the field winding in the direction of the DC field is called the rotor direct axis or the d-axis. The axis that is 90 degrees after the d-ax s is called the quadrature axis or q-axis.

The rotor speed 432 is a (mechanical) rotational speed of the rotor of the electric motor 198. The rotor speed 432 may be measured, for example, using a rotor speed sensor 436. In various implementations, the rotor speed 432 may be determined by a rotor speed module based on one or more other parameters, such change in position of the rotor over time where position is determined based on phase currents 440 (e.g., Ia, Ib, Ic) of the electric motor 198. In various implementations, the rotor speed sensor 436 may determine a position of the rotor, and the rotor speed sensor 436 (or a speed module, such as of the motor control module 196) may determine the rotor speed 432 based on a change in the rotor position over time (e.g., using a mathematical derivative of the position with respect to time). Current sensors 442 may measure the phase currents 440, such as in the respective legs of the inverter module 256. In various implementations, one or more of the phase currents 440 may be estimated.

Figure 5:
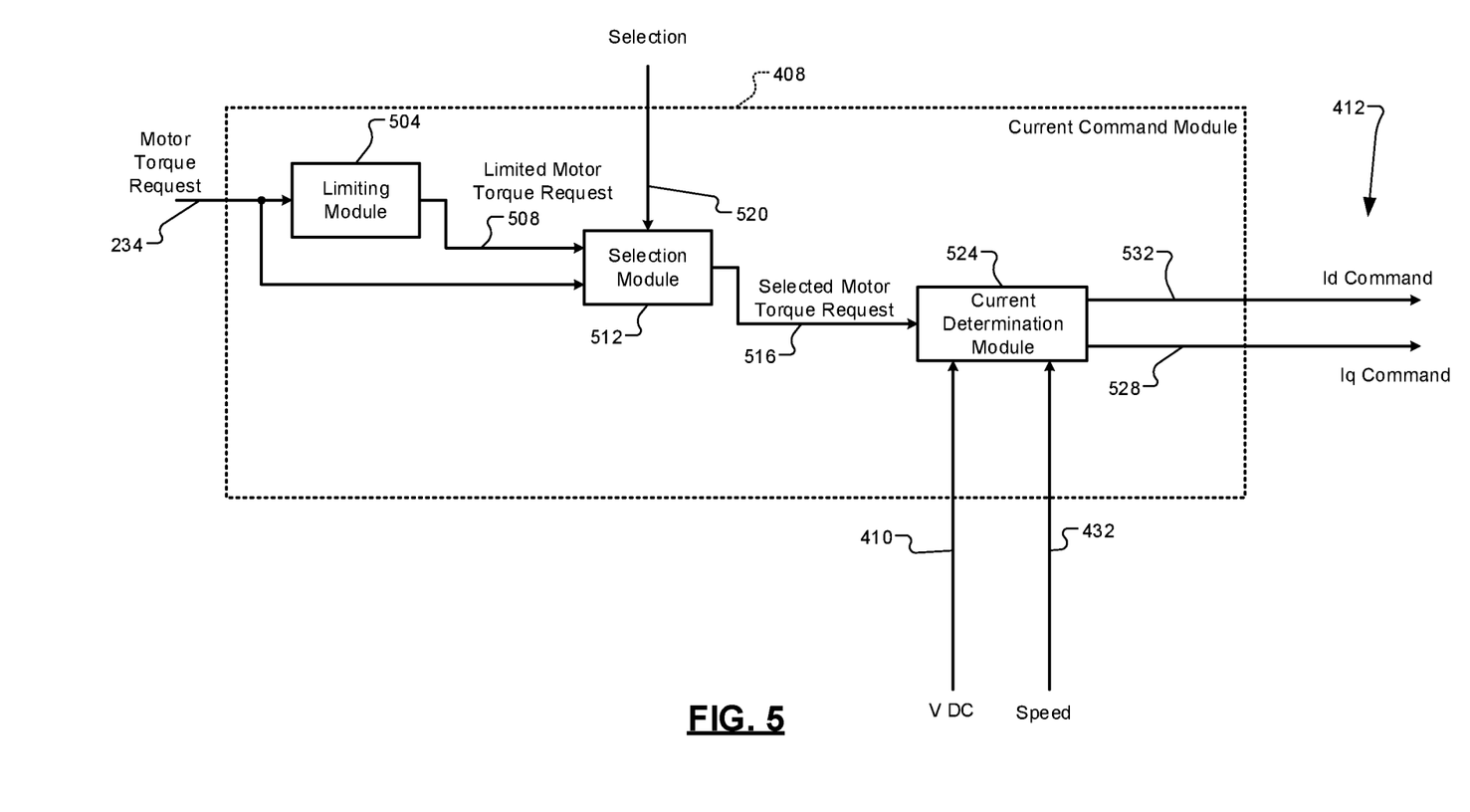
FIG. 5 is a functional block diagram of an example implementation of a current command module.

FIG. 5 includes a functional block diagram of an example implementation of the current command module 408. A limiting module 504 outputs a limited motor torque request 508 based on the motor torque request 234. The limiting module 504 sets the limited motor torque request 508 to the motor torque request 234 when the motor torque request 234 is less than or equal to a predetermined maximum torque. The limiting module 504 sets the limited motor torque request 508 to the predetermined maximum torque when the motor torque request 234 is greater than the predetermined maximum torque. The predetermined maximum torque is calibratable and may be set to, for example, a predetermined percentage (less than 100 percent, such as 10 percent or another suitable percentage) of a maximum output torque of the electric motor 198.

A selection module 512 sets a selected motor torque request 516 to either the limited motor torque request 508 or the motor torque request 234 based on a state of a selection signal 520. For example, when the selection signal 520 is in a first state, the selection module 512 sets the selected motor torque request 516 to the motor torque request 234. When the selection signal 520 is in a second state, the selection module 512 sets the selected motor torque request 516 to the limited motor torque request. This limits the selected motor torque request 516 to the predetermined maximum torque when the selection signal 520 is in the second state. Setting of the selection signal 520 is discussed further below.

A current determination module 524 determines the q-axis current command 528 and the d-axis current command 532 based on the selected motor torque request 516, the rotor speed 432 of the electric motor 198, and the DC bus voltage 410. The current determination module 524 may determine the d and q-axis current commands 532 and 528, for example, using one or more equations and/or lookup tables that relate DC bus voltages, speeds, and torque requests to d and q-axis current commands.

Referring back to FIG. 4, a voltage command module 456 determines voltage commands for the electric motor 198 based on the d-axis current command 532, the q-axis current command 528, a d-axis current of the electric motor 198, and a q-axis current of the electric motor 198. The d-axis voltage command and the q-axis voltage command are collectively illustrated by 460 in FIG. 4. In various implementations, the voltage command module 456 may generate the voltage commands 460 using closed-loop control to adjust the d and q-axis currents 444 toward or to the d and q-axis current commands 412, respectively. A frame of reference (FOR) module 448 may transform the phase currents 440 into the d and q-axis currents 444 by applying a Clarke transform and a Park transform.

Figure 6:
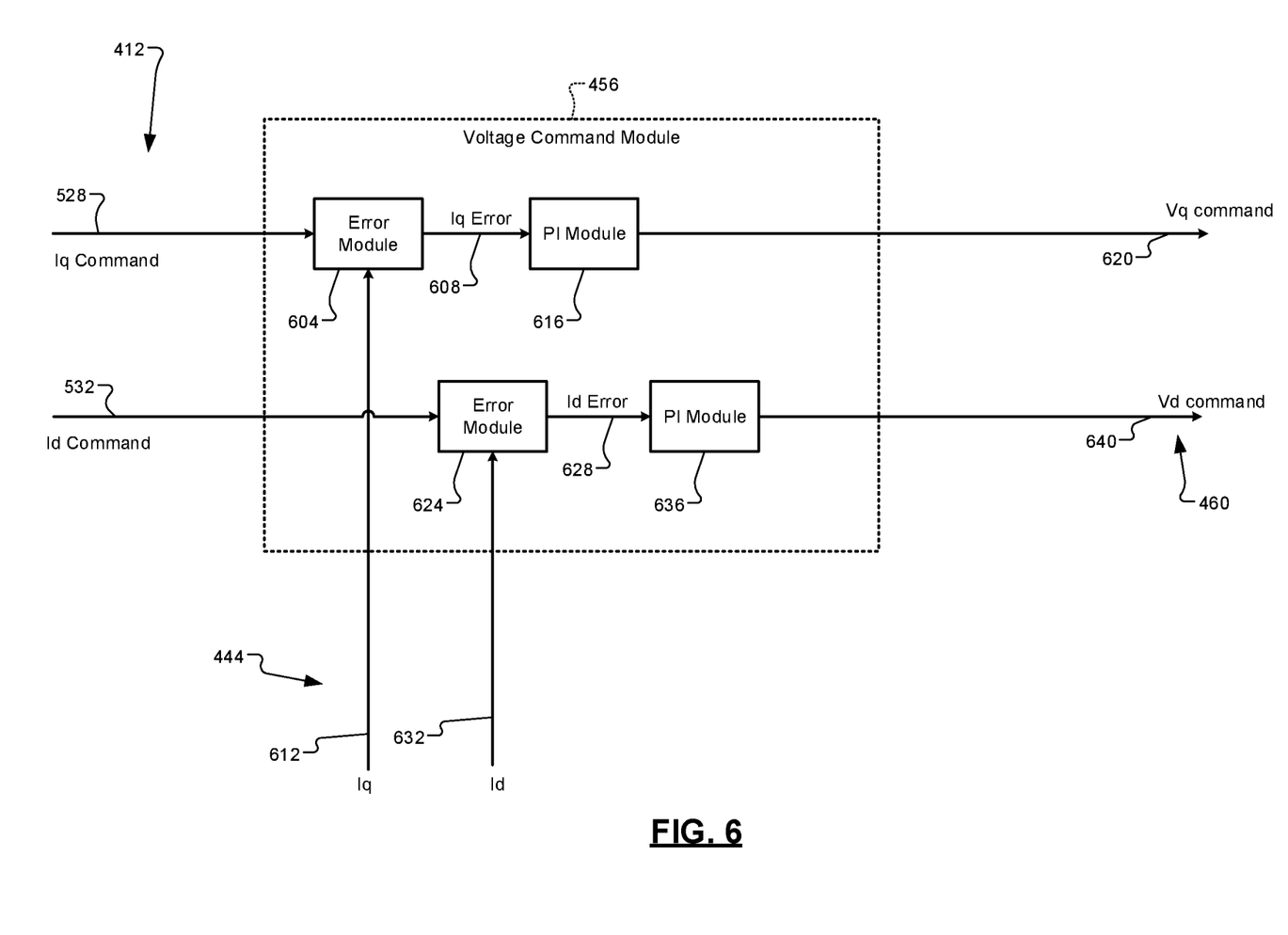
FIG. 6 is a functional block diagram of an example implementation of a voltage command module.

FIG. 6 is a functional block diagram of an example implementation of the voltage command module 456. An error module 604 determines a first (Iq) error 608 based on a difference between the q-axis current command 528 and the q-axis current 612. The error module 604 may set the first error 608, for example, based on or equal to the q-axis current command 528 minus the q-axis current 612 or based on or equal to the q-axis current 612 minus the q-axis current command 528. A proportional integral (PI) module 616 generates the q-axis voltage command 620 based on the first error 608 to adjust the first error 608 toward or to zero. While the example of the PI module 616 is discussed, another type of closed-loop control may be used.

An error module 624 determines a second (Id) error 628 based on a difference between the d-axis current command 532 and the d-axis current 632. The error module 624 may set the second error 628, for example, based on or equal to the d-axis current command 532 minus the d-axis current 632 or based on or equal to the d-axis current 632 minus the d-axis current command 532. A proportional integral (PI) module 636 generates the d-axis voltage command 640 based on the second error 628 to adjust the second error 628 toward or to zero. While the example of the PI module 636 is discussed, another type of closed-loop control may be used.

Referring back to FIG. 4, the switching control module 404 determines final duty cycles of the PWM signals to apply to the phases of the electric motor 198 based on the d and q-axis voltage commands. For example, the switching control module 404 may determine initial duty cycle commands using one or more equations or lookup tables that relate voltage commands to PWM duty cycles. The switching control module 404 switches the switches of the inverter module 256 based on the PWM duty cycles.

A torque sensor 468 may measure a present torque 469 of the electric motor 198. In various implementations, the present torque 469 may be estimated based on one or more other parameters.

The switching control module 404 determines final duty cycles of the PWM signals to apply to the phases of the electric motor 198 based on the d and q-axis voltage commands. For example, the switching control module 404 may determine initial duty cycle commands using one or more equations or lookup tables that relate voltage commands to PWM duty cycles. The switching control module 404 switches the switches of the inverter module 256 based on the PWM duty cycles.

A state of health (SOH) module 470 determines a SOH (value) 474 representative of a SOH of the stator windings of the electric motor 198. A selection module 480 generates the selection signal 520 based on the SOH 474. A fault module 482 determines and indicates whether the stator windings of the electric motor 198 are degraded or include a fault.

Figure 7:
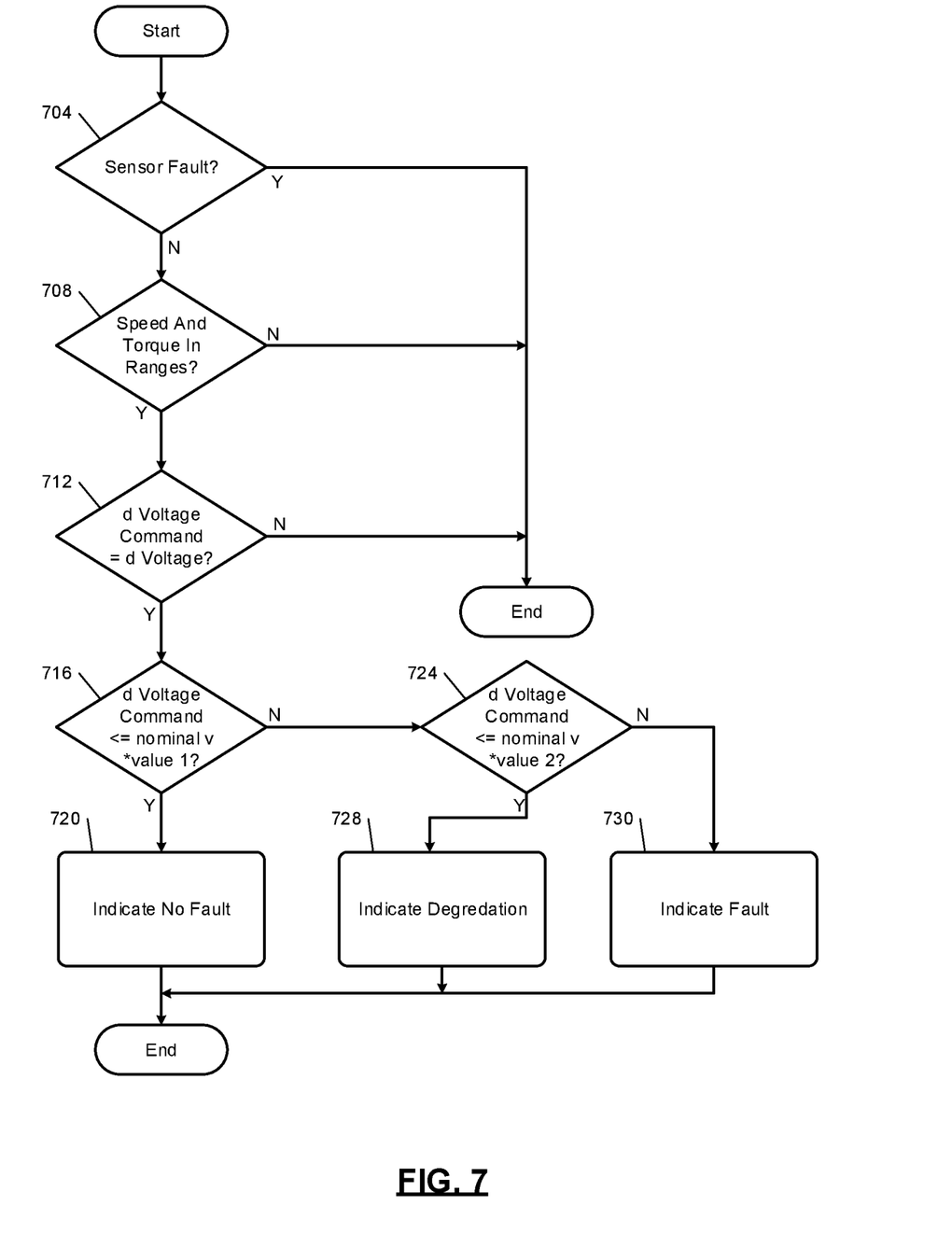
FIG. 7 is a flowchart depicting an example method of diagnosing degradation and faults in stator windings of an electric motor.

FIG. 7 is a flowchart depicting an example method of diagnosing degradation and faults in the stator windings of the electric motor 198. Control begins with 704 where the fault module 482 determines whether one or more of the sensors used below have been diagnosed with a fault. For example, the fault module 482 may determine whether one or more predetermined diagnostic trouble codes (DTCs) indicative of faults in the sensors (e.g., the speed sensor 436, the torque sensor 468, the current sensors 442), respectively, have been stored in memory of the vehicle. If 704 is true, the fault module 482 disables the diagnostic of the stator windings of the electric motor 198, and control may end. If 704 is false, control may continue with 708.

At 708, the fault module 482 determines whether the rotor speed 432 is within a predetermined speed range and a torque of the electric motor 198 is within a predetermined torque range. If 708 is false, the fault module 482 disables the diagnostic of the stator windings of the electric motor 198, and control may end. If 708 is true, control continues with 712. The torque may be, for example, the present torque 469 of the electric motor 198 or the selected motor torque request 516. The predetermined speed and torque ranges are calibratable. The predetermined speed range is greater than zero revolutions per minute (rpm) and may be, for example, 3000-10,000 rpm or another suitable speed range. The predetermined torque range is near zero newton meters (Nm) and may be, for example, +/−1 Nm or another other suitable torque range.

At 712, the fault module 482 determines whether the d-axis voltage command 640 is equal to or approximately equal to a present d-axis voltage of the electric motor 198. If 712 is false, the fault module 482 disables the diagnostic of the stator windings of the electric motor 198, and control may end. If 712 is true, control continues with 716. The fault module 482 may determine the present d-axis voltage, for example, based on the d and q-axis currents 444. The fault module 482 may determine the present d-axis voltage, for example, using one of an equation and a lookup table that relates d and q-axis currents to d-axis voltages. The fault module 482 may consider the d-axis voltage command 640 (d voltage command) as being approximately equal to the present d-axis voltage (d voltage) when the d-axis voltage command 640 is within a predetermined percentage of the d-axis voltage. The predetermined percentage may be calibratable and may be, for example 5 percent, less than 5 percent, or another suitable value.

At 716, the fault module 482 determines whether the d-axis voltage command 640 is less than or equal to a predetermined nominal (d-axis) voltage of the electric motor 198 multiplied by a first predetermined scalar value (value 1). The predetermined nominal voltage is calibrated based on the predetermined speed and torque ranges. The predetermined nominal voltage is a fixed value that corresponds to a nominal voltage of the electric motor 198 during when speed and torque of the electric motor 198 are within the predetermined speed and torque ranges. The first predetermined scalar value is calibratable and is a value less than 1.0. The first predetermined scalar value may be, for example, 0.8 or another suitable value. If 716 is true, the fault module 482 indicates that no fault (or degradation) is present in the stator windings at 720, and control may end. For example, the fault module 482 may set a fault flag associated with the stator windings in memory to a first state at 720. If 716 is false, control transfers to 724.

At 724, the fault module 482 determines whether the d-axis voltage command 640 is less than or equal to than the predetermined nominal (d-axis) voltage of the electric motor 198 multiplied by a second predetermined scalar value (value 2). The second predetermined scalar value is calibratable and is a value less than 1.0 and is less than the first predetermined scalar value. The second predetermined scalar value may be, for example, 0.5 or another suitable value. If 724 is true, the fault module 482 indicates that the stator windings of the electric motor 198 are degraded (but not yet faulty) at 728, and control may end. For example, the fault module 482 may set the fault flag to a second state at 728.

The fault module 482 may also take one or more other remedial actions when the stator windings are degraded. For example, the fault module 482 may turn on a warning device 486 to alert a driver of the vehicle that the stator windings are degraded. The warning device 486 may be, for example, a visual warning device (e.g., a malfunction indicator light (MIL), or a display), an audible warning device (e.g., one or more speakers), and/or a haptic warning device (e.g., one or more vibrating devices). The fault module 482 may additionally or alternatively prompt a user associated with the vehicle to schedule maintenance of the vehicle (e.g., for replacement of the entire electric motor 198 or the stator windings). The fault module 482 may prompt the user, for example, by sending a message to a phone number associated with the user, sending an email to an email address associated with the user, or in another suitable manner.

If 724 is false, the fault module 482 indicates that a fault is present in the stator windings at 730, and control may end. For example, the fault module 482 may set the fault flag to a third state at 728. The selection module 480 may also set the selection signal 520 to the second state at 730 such that the selected motor torque request 516 will be limited to the predetermined maximum motor torque at a maximum via the limiting of the limited motor torque request 508 to the predetermined maximum motor torque and the setting of the selected motor torque request 516 to the limited motor torque request 508.

The fault module 482 may also take one or more other remedial actions when a fault is present in the stator windings. For example, the fault module 482 may turn on the warning device 486 to alert a driver of the vehicle that the stator windings have a fault. The fault module 482 may additionally or alternatively prompt a user associated with the vehicle to schedule maintenance of the vehicle (e.g., for replacement of the entire electric motor 198 or the stator windings). The fault module 482 may prompt the user, for example, by sending a message to a phone number associated with the user, sending an email to an email address associated with the user, or in another suitable manner. The fault module 482 may send messages, emails, and other data via one or more transceivers, such as transceiver 490 (e.g., a cellular transceiver). While control is shown and discussed as ending, the example of FIG. 7 may be illustrative of one control loop and control may return to 704.

Figure 8:
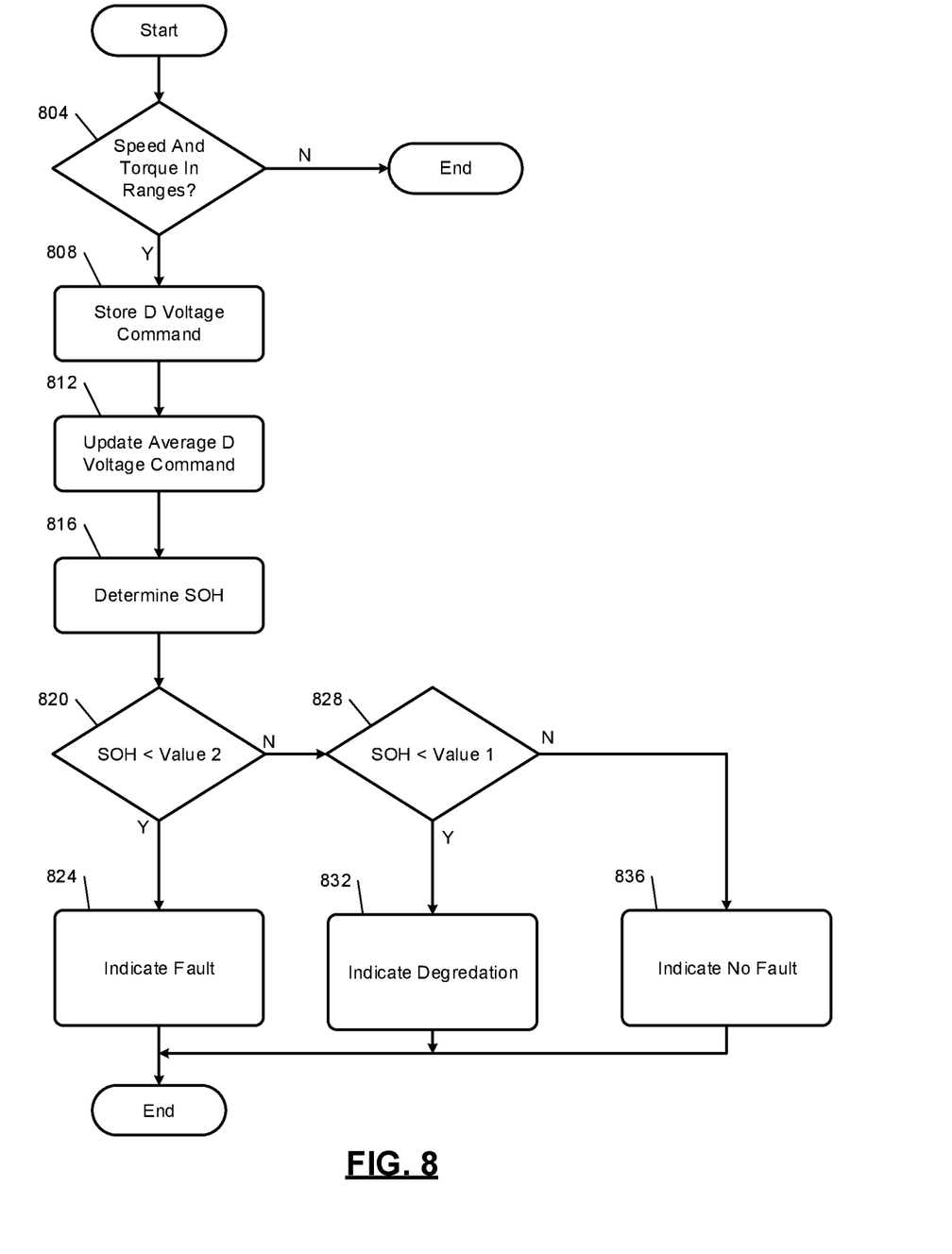
FIG. 8 is a flowchart depicting an example method of determining a state of health (SOH) of stator windings of an electric motor and diagnosing degradation and faults in the stator windings based on the SOH.

FIG. 8 is a flowchart depicting an example method of determining the SOH of the stator windings and diagnosing degradation and faults in the stator windings of the electric motor 198 based on the SOH. Control begins with 804 where the SOH module 470 determines whether the rotor speed 432 is within the predetermined speed range and the torque of the electric motor 198 is within the predetermined torque range. If 804 is false, the SOH module 470 does not update the SOH 474 of the electric motor, and the fault module 482 disables the diagnostic of the stator windings of the electric motor 198 based on the SOH 474. Control may end. If 804 is true, control may continue with 808.

At 808, the SOH module 470 stores the d-axis voltage command 640. At 812, the SOH module 470 updates an average d-axis voltage command. The SOH module 470 determines the d-axis voltage command based on an average of the N most recently stored values of the d-axis voltage command 640. For example, the SOH module 470 may sum the N most recently stored values of the d-axis voltage command 640 and divide the sum by N. N is an integer greater than 1 and may be, for example, 10 or another suitable value.

At 816, the SOH module 470 determines the SOH 474 of the stator windings. The SOH module 470 determines the SOH 474 based on the average d-axis voltage command and the predetermined nominal voltage. The SOH module 470 may determine the SOH 474, for example, using one of an equation and a lookup table that relates average d-axis voltage commands and predetermined nominal voltages to SOHs. For example, the SOH module 470 may set the SOH 474 based on or equal to the average d-axis voltage command divided by the predetermined nominal voltage. The SOH 474 may be a value between 0 and 1 and reflects the present SOH of the stator windings. The present SOH may increase as the SOH 474 increases and may decrease as the SOH 474 decreases. The fault module 482 may transmit the SOH 474 to a remote location, such as a remote server, via one or more transceivers, such as the transceiver 490.

At 820, the fault module 482 determines whether the SOH 474 is less than a second predetermined value (Value 2). The second predetermined value is calibratable and is less than 1 in the example of the SOH 474 being between 0 and 1. For example only, the second predetermined value may be 0.8, 0.85, or another suitable value. If 820 is false, control transfers to 828. If 820 is true, the fault module 482 indicates that a fault is present in the stator windings at 824, and control may end. For example, the fault module 482 may set the fault flag to the third state at 824. The selection module 480 may also set the selection signal 520 to the second state at 824 such that the selected motor torque request 516 will be limited to the predetermined maximum motor torque at a maximum via the limiting of the limited motor torque request 508 to the predetermined maximum motor torque and the setting of the selected motor torque request 516 to the limited motor torque request 508.

The fault module 482 may also take one or more other remedial actions when a fault is present in the stator windings. For example, the fault module 482 may turn on the warning device 486 to alert a driver of the vehicle that the stator windings have a fault. The fault module 482 may additionally or alternatively prompt a user associated with the vehicle to schedule maintenance of the vehicle (e.g., for replacement of the entire electric motor 198 or the stator windings). The fault module 482 may prompt the user, for example, by sending a message to a phone number associated with the user, sending an email to an email address associated with the user, or in another suitable manner.

At 828, the fault module 482 determines whether the SOH 474 is less than a first predetermined value (Value 1). The first predetermined value is greater than the second predetermined value and is less than 1 in the example of the SOH 474 being between 0 and 1. The first predetermined value and may be, for example, 0.9, 0.95, or another suitable value. If 828 is false, the fault module 482 indicates that no fault (or degradation) is present in the stator windings at 836, and control may end. For example, the fault module 482 may set the fault flag to the first state at 836. If 828 is true, the fault module 482 indicates that the stator windings of the electric motor 198 are degraded (but not yet faulty) at 832, and control may end. For example, the fault module 482 may set the fault flag to the second state at 832.

The fault module 482 may also take one or more other remedial actions when the stator windings are degraded. For example, the fault module 482 may turn on the warning device 486 to alert a driver of the vehicle that the stator windings are degraded. The fault module 482 may additionally or alternatively prompt a user associated with the vehicle to schedule maintenance of the vehicle (e.g., for replacement of the entire electric motor 198 or the stator windings). The fault module 482 may prompt the user, for example, by sending a message to a phone number associated with the user, sending an email to an email address associated with the user, or in another suitable manner.

While control is shown and discussed as ending, the example of FIG. 8 may be illustrative of one control loop and control may return to 804.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects. The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A diagnostic system of a vehicle comprising:
   a current command module configured to, based on a motor torque request, a motor speed, a direct current (DC) bus voltage, generate a d-axis current command for an electric motor and a q-axis current command for the electric motor;
   a voltage command module configured to, based on the d-axis current command and the q-axis current command, generate a d-axis voltage command and a q-axis voltage command;
   a switching control module configured to control switching of an inverter module based on the d-axis voltage command and the q-axis voltage command,
   wherein the inverter module is configured to apply power to stator windings of the electric motor from the DC bus; and
   a fault module configured to compare the d-axis voltage command with a predetermined nominal d-axis voltage and to selectively indicate that the stator windings of the electric motor are degraded when the d-axis voltage command is less than the predetermined nominal d-axis voltage of the electric motor.

2. The diagnostic system of claim 1 wherein the fault module is configured to indicate that the stator windings of the electric motor are degraded when the d-axis voltage command is both:
   less than the predetermined nominal d-axis voltage multiplied by a first predetermined scalar value; and
   greater than the predetermined nominal d-axis voltage multiplied by a second predetermined scalar value.

3. The diagnostic system of claim 2 wherein the second predetermined scalar value is less than the first predetermined scalar value.

4. The diagnostic system of claim 2 wherein the fault module is further configured to indicate that a fault is present in the stator windings of the electric motor when the d-axis voltage command is less than the predetermined nominal d-axis voltage multiplied by the second predetermined scalar value.

5. The diagnostic system of claim 2 further comprising a limiting module configured to limit the motor torque request to a predetermined maximum torque when the fault is present in the stator windings.

6. The diagnostic system of claim 5 wherein the motor torque request is not limited to the predetermined maximum torque when the fault is not present in the stator windings.

7. The diagnostic system of claim 2 wherein the fault module is further configured to indicate that the stator windings are not degraded and do not have a fault when the d-axis voltage command is greater than the predetermined nominal d-axis voltage multiplied by the first predetermined scalar value.

8. The diagnostic system of claim 1 wherein the fault module is configured to disable diagnosis of the stator windings of the electric motor when a fault has occurred in one of a speed sensor, a torque sensor, and a current sensor.

9. The diagnostic system of claim 1 wherein the fault module is configured to disable diagnosis of the stator windings of the electric motor when at least one of:
   a speed of the electric motor is outside of a predetermined speed range; and
   a torque of the electric motor is outside of a predetermined torque range.

10. The diagnostic system of claim 9 wherein the predetermined nominal d-axis voltage is set based on the predetermined speed range and the predetermined torque range.

11. The diagnostic system of claim 1 wherein the fault module is configured to disable diagnosis of the stator windings of the electric motor when the d-axis voltage command is not within a predetermined percentage of a d-axis voltage of the electric motor.

12. A diagnostic system comprising:
   a current command module configured to, based on a motor torque request, a motor speed, a direct current (DC) bus voltage, generate a d-axis current command for an electric motor and a q-axis current command for the electric motor;

a voltage command module configured to, based on the d-axis current command and the q-axis current command, generate a d-axis voltage command and a q-axis voltage command;

a switching control module configured to control switching of an inverter module based on the d-axis voltage command and the q-axis voltage command, wherein the inverter module is configured to apply power to stator windings of the electric motor from the DC bus;

a state of health (SOH) module configured to, based on the d-axis voltage command, determine a SOH value corresponding to a SOH of the stator windings; and a fault module configured to selectively indicate that the stator windings of the electric motor are degraded based on the SOH value, to compare the d-axis voltage command with a predetermined nominal d-axis voltage, and to selectively indicate that the stator windings of the electric motor are degraded when the d-axis voltage command is less than the predetermined nominal d-axis voltage of the electric motor.

13. The diagnostic system of claim 12 wherein the fault module is configured to indicate that the stator windings are degraded when the SOH value is less than a first predetermined value and greater than a second predetermined value that is less than the first predetermined value.

14. The diagnostic system of claim 13 wherein the fault module is further configured to indicate that a fault is present in the stator windings when the SOH value is less than the second predetermined value.

15. The diagnostic system of claim 14 further comprising a limiting module configured to limit the motor torque request to a predetermined maximum torque when the fault is present in the stator windings.

16. The diagnostic system of claim 15 wherein the motor torque request is not limited to the predetermined maximum torque when the fault is not present in the stator windings.

17. The diagnostic system of claim 13 wherein the fault module is further configured to indicate that the stator windings are not degraded and do not have a fault when the SOH is greater than the first predetermined value.

18. The diagnostic system of claim 12 wherein the SOH module is configured to determine the SOH value further based on a predetermined nominal d-axis voltage of the electric motor.

19. The diagnostic system of claim 18 wherein the SOH module is configured to determine the SOH value based on (a) divided by (b), where
 (a) is an average of N of the d-axis voltage commands while a speed of the electric motor is within a predetermined speed range and a torque of the electric motor is within a predetermined torque range,
 wherein N is an integer greater than one; and
 (b) is the predetermined nominal d-axis voltage.

20. The diagnostic system of claim 19 wherein the predetermined nominal d-axis voltage is set based on the predetermined speed range and the predetermined torque range.

* * * * *